No. 693,627. Patented Feb. 18, 1902.
M. T. SHARP.
MEAT CUTTING BLOCK.
(Application filed May 13, 1901.)

(No Model.)

Witnesses
James J. Crown
H. J. Shepard

M. T. Sharp, Inventor.
by C. A. Snow & Co.
Attorneys

UNITED STATES PATENT OFFICE.

MORRIS T. SHARP, OF MOUNT VERNON, OHIO.

MEAT-CUTTING BLOCK.

SPECIFICATION forming part of Letters Patent No. 693,627, dated February 18, 1902.

Application filed May 13, 1901. Serial No. 60,111. (No model.)

*To all whom it may concern:*

Be it known that I, MORRIS T. SHARP, a citizen of the United States, residing at Mount Vernon, in the county of Knox and State of Ohio, have invented a new and useful Meat-Cutting Block, of which the following is a specification.

This invention relates to cutting-blocks upon which to cut and slice meat, and has for its object to provide an improved device of this character which is especially designed for use in cutting juicy meats—as, for instance liver—and arranged for collecting the juice and blood, so as to prevent the same from dripping from the block. It is furthermore designed to have the block and the juice-collecting device detachably connected, so as to facilitate the cleansing thereof, and thereby provide a sanitary device, and also to maintain these parts in their proper normal relation, so as to insure an effective collecting of the juices.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
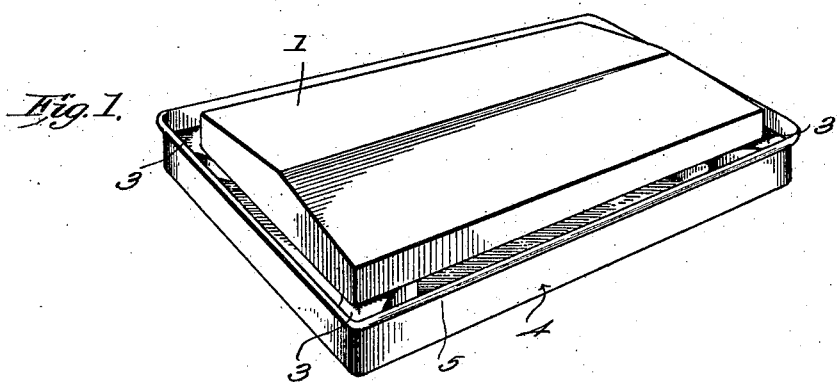
Figure 2:
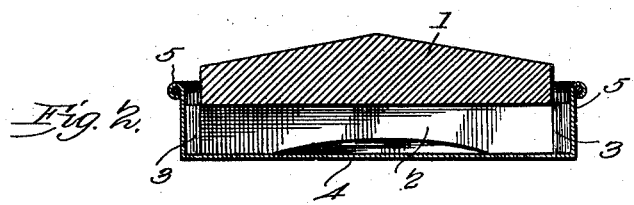
Figure 3:
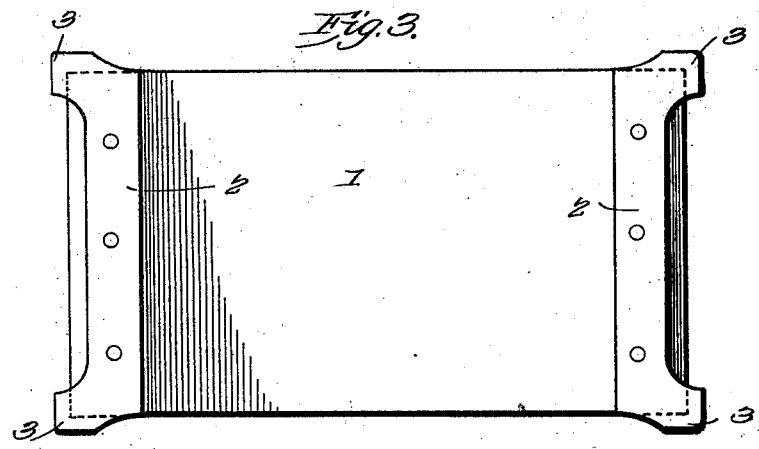

In the drawings, Figure 1 is a perspective view of a cutting-block embodying the present invention. Fig. 2 is a transverse sectional view thereof. Fig. 3 is a bottom plan view of the block proper removed from the pan or tray.

Like characters of reference designate corresponding parts in all of the figures of the drawings.

In carrying out the present invention there is provided a wooden block 1 of suitable shape, preferably rectangular, having a flat lower side and a convexed upper side or top, so as to drain to opposite sides thereof. Across the opposite ends of the bottom thereof there are provided the opposite duplicate cross-bars 2, each of which lies slightly inward from the adjacent end of the block and has its opposite ends projected beyond the opposite longitudinal edges of the block and also widened to project at the end of the block, thereby providing spacing projections 3 at the four corners of the block. As best indicated in Fig. 2, the under side of each cross-bar is concaved to form a bridge or arched bar, the opposite ends of which form supporting-feet for the block. This block is received within a metallic pan or tray 4, having an upstanding marginal rim 5, that surrounds the block, the latter being slightly smaller than the pan, so as to provide a marginal space between the block and the rim of the pan. The opposite terminal feet of the cross-bars rest upon the bottom of the pan, so as to support the top face of the block above the top edge of the pan, and the corner projections lie snugly in the respective corners of the pan, thereby to space the marginal edge of the block away from the rim of the pan and also to prevent accidental movement of the block within the pan. By having the entire upper surface of the block arranged above the top edge of the pan and the inclination thereof such as to clear the said edge of the pan there is little danger of the knife coming in contact with the metallic rim, whereby the cutting-knife is effectively protected. Moreover, the inclination or bevel of the block causes the blood and juices to run off at the edges of the block and drip into the pan, wherein the blood and juices are collected, and thereby prevented from escaping. As the bottom of the block is spaced above the bottom of the pan by means of the cross bars or feet, there is a large area for the collection of the blood. The block may be conveniently removed from the pan either by grasping the opposite projected edges thereof and lifting the same from the pan or by inverting the latter and dropping the block therefrom, whereby the block and pan may be conveniently cleansed to maintain the device in a sanitary condition.

What is claimed is—

1. A meat-cutting block comprising a pan and a block removably contained therein and of smaller horizontal dimensions than the pan and supported above the bottom thereof, the operative surface of the block extending above the rim of the pan and being hipped or convexed.

2. A meat-cutting block, comprising a pan, a cutting-block removably contained therein, and marginal supporting-feet carried by the block, projected below and outwardly from the same, said feet resting upon the bottom of the pan and also against the marginal edge thereof, whereby the block is supported above the bottom of the pan, and a marginal space is provided between the marginal edges of the block and the pan.

3. A meat-cutting block, comprising a substantially rectangular pan having an upstanding marginal rim, a cutting-block contained therein and having a convexed upper face, and opposite cross-bars secured to the opposite end portions of the bottom of the block, and provided with terminal and lateral outwardly-directed projections occupying the respective corners of the pan.

4. A meat-cutting block, comprising a substantially rectangular pan, having an upstanding marginal rim, and a cutting-block slightly smaller in size than the pan and contained therein, the upper face of the block being convexed, and supporting-feet carried by the block and projected at the corners thereof and below the bottom of the block, said feet occupying the respective corners of the pan in engagement with the bottom and sides thereof, whereby the block is supported above the bottom of the pan, and a marginal space is provided between the marginal edges of the block and the pan.

In testimony that I claim the foregoing as my own I have hereto affixed my signature in the presence of two witnesses.

MORRIS T. SHARP.

Witnesses:
JOHN J. KELLY,
WM. M. BRICKER.